(12) United States Patent
Barnes et al.

(10) Patent No.: US 8,442,858 B1
(45) Date of Patent: May 14, 2013

(54) SUBSCRIBER DATA INSERTION INTO ADVERTISEMENT REQUESTS

(75) Inventors: James D. Barnes, Overland Park, KS (US); Sanjay K. Sharma, Olathe, KS (US); Robin D. Katzer, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1743 days.

(21) Appl. No.: 11/491,387

(22) Filed: Jul. 21, 2006

(51) Int. Cl.
*G06Q 30/00* (2012.01)

(52) U.S. Cl.
USPC .......................................................... 705/14

(58) Field of Classification Search ............. 705/14
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A | 12/1998 | Marsh et al. | |
| 5,918,014 A | 6/1999 | Robinson | |
| 5,918,041 A | 6/1999 | Berstis | |
| 5,933,811 A * | 8/1999 | Angles et al. | 705/14 |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 | 5/2001 | Levine et al. | |
| 6,266,649 B1 | 7/2001 | Linden et al. | |
| 6,286,005 B1 | 9/2001 | Cannon | |
| 6,317,722 B1 | 11/2001 | Jacobi et al. | |
| 6,321,983 B1 | 11/2001 | Katayanagi et al. | |
| 6,332,127 B1 | 12/2001 | Bandera et al. | |
| 6,826,575 B1 | 11/2004 | Waclawski | |
| 6,834,266 B2 | 12/2004 | Kumar et al. | |
| 6,839,680 B1 | 1/2005 | Liu et al. | |
| 6,853,982 B2 | 2/2005 | Smith et al. | |
| 6,910,017 B1 | 6/2005 | Woo et al. | |
| 6,963,867 B2 | 11/2005 | Ford et al. | |
| 6,966,536 B2 | 11/2005 | Enomoto et al. | |
| 6,990,462 B1 | 1/2006 | Wilcox et al. | |
| 7,022,905 B1 | 4/2006 | Hinman et al. | |
| 7,065,532 B2 | 6/2006 | Elder et al. | |
| 7,096,194 B2 | 8/2006 | Johnson | |
| 7,127,313 B2 | 10/2006 | Neri | |
| 7,143,143 B1 | 11/2006 | Thompson | |
| 7,251,615 B2 | 7/2007 | Woo | |
| 7,284,033 B2 | 10/2007 | Jhanji | |
| 7,353,267 B1 | 4/2008 | Cunningham et al. | |
| 7,406,436 B1 | 7/2008 | Reisman | |
| 7,437,308 B2 | 10/2008 | Kumar et al. | |
| 7,481,367 B2 | 1/2009 | Fees et al. | |
| 7,647,258 B2 | 1/2010 | William et al. | |
| 7,676,394 B2 | 3/2010 | Ramer et al. | |

(Continued)

OTHER PUBLICATIONS

Lightningcast, Inc., "Lightningcast Mobile Video Advertising Solution," May 2, 2005, 14 pgs.

(Continued)

*Primary Examiner* — Alvin L Brown

(57) ABSTRACT

A method is provided for subscriber data insertion into advertisement requests. The method includes receiving a request for advertising content for a subscriber from a publisher. The request contains a unique subscriber identifier associated with the subscriber. The method further includes obtaining carrier controlled subscriber data related to the subscriber based on the unique subscriber identifier. The method additionally includes inserting the carrier controlled subscriber data into the request.

19 Claims, 4 Drawing Sheets

U.S. PATENT DOCUMENTS

| | | | |
|---|---|---|---|
| 7,788,644 B2 | 8/2010 | Koduru et al. | |
| 7,840,498 B2 | 11/2010 | Frank et al. | |
| 7,958,005 B2 | 6/2011 | Dangaltchev | |
| 7,974,616 B1 | 7/2011 | Urbanek | |
| 8,326,673 B1 | 12/2012 | Biere et al. | |
| 2001/0039500 A1 | 11/2001 | Johnson | |
| 2001/0044743 A1 | 11/2001 | McKinley et al. | |
| 2001/0047294 A1 | 11/2001 | Rothschild | |
| 2002/0010627 A1 | 1/2002 | Lerat | |
| 2002/0013727 A1 | 1/2002 | Lee | |
| 2002/0026355 A1 | 2/2002 | Mitsuoka et al. | |
| 2002/0026361 A1 | 2/2002 | Blom | |
| 2002/0030100 A1 | 3/2002 | Katayanagi et al. | |
| 2002/0032771 A1 | 3/2002 | Gledje | |
| 2002/0035474 A1 | 3/2002 | Alpdemir | |
| 2002/0059387 A1 | 5/2002 | Wolfe | |
| 2002/0060246 A1 | 5/2002 | Gobburu et al. | |
| 2002/0065713 A1 | 5/2002 | Awada et al. | |
| 2002/0091569 A1 | 7/2002 | Kitaura et al. | |
| 2002/0091571 A1 | 7/2002 | Thomas et al. | |
| 2002/0095333 A1 | 7/2002 | Jokinen et al. | |
| 2002/0107027 A1 | 8/2002 | O'Neil | |
| 2002/0128904 A1 | 9/2002 | Carruthers et al. | |
| 2002/0128908 A1 | 9/2002 | Levin et al. | |
| 2002/0143630 A1 | 10/2002 | Steinman et al. | |
| 2002/0152133 A1 | 10/2002 | King et al. | |
| 2002/0184080 A1 | 12/2002 | Murad et al. | |
| 2003/0004802 A1 | 1/2003 | Callegari | |
| 2003/0004808 A1 | 1/2003 | Elhaoussine et al. | |
| 2003/0018516 A1 | 1/2003 | Ayala et al. | |
| 2003/0018558 A1 | 1/2003 | Heffner et al. | |
| 2003/0028451 A1 | 2/2003 | Ananian | |
| 2003/0050863 A1 | 3/2003 | Radwin | |
| 2003/0074251 A1 | 4/2003 | Kumar et al. | |
| 2003/0074259 A1 | 4/2003 | Slyman, Jr. et al. | |
| 2003/0101024 A1 | 5/2003 | Adar et al. | |
| 2003/0101449 A1 | 5/2003 | Bentolila et al. | |
| 2003/0126250 A1 | 7/2003 | Jhanji | |
| 2003/0171962 A1 | 9/2003 | Hirth et al. | |
| 2003/0172007 A1 | 9/2003 | Helmolt et al. | |
| 2003/0229502 A1 | 12/2003 | Woo | |
| 2004/0019540 A1 | 1/2004 | William et al. | |
| 2004/0019541 A1 | 1/2004 | William et al. | |
| 2004/0111315 A1 | 6/2004 | Sharma et al. | |
| 2005/0021403 A1 | 1/2005 | Ozer et al. | |
| 2005/0028188 A1 | 2/2005 | Latona et al. | |
| 2005/0101332 A1 | 5/2005 | Kotzin | |
| 2005/0102272 A1 | 5/2005 | Kumar et al. | |
| 2005/0114829 A1 | 5/2005 | Robin et al. | |
| 2005/0177419 A1 | 8/2005 | Choi et al. | |
| 2005/0193036 A1 | 9/2005 | Phillips et al. | |
| 2005/0194431 A1 | 9/2005 | Fees et al. | |
| 2005/0197887 A1 | 9/2005 | Zuerl et al. | |
| 2005/0197918 A1 | 9/2005 | Wittmer et al. | |
| 2005/0215238 A1 | 9/2005 | Macaluso | |
| 2005/0228754 A1 | 10/2005 | Pezzaniti et al. | |
| 2005/0246394 A1 | 11/2005 | Neri | |
| 2005/0256759 A1 | 11/2005 | Acharya et al. | |
| 2005/0278296 A1 | 12/2005 | Bostwick | |
| 2006/0080135 A1 | 4/2006 | Frank et al. | |
| 2006/0080171 A1 | 4/2006 | Jardins et al. | |
| 2006/0085253 A1 | 4/2006 | Mengerink et al. | |
| 2006/0085517 A1 | 4/2006 | Kaurila | |
| 2006/0141428 A1 | 6/2006 | Herrod et al. | |
| 2006/0224437 A1 | 10/2006 | Gupta et al. | |
| 2007/0005647 A1 | 1/2007 | Cugi et al. | |
| 2007/0026871 A1* | 2/2007 | Wager | 455/456.1 |
| 2007/0061229 A1 | 3/2007 | Ramer et al. | |
| 2007/0100963 A1 | 5/2007 | Ban et al. | |
| 2007/0106520 A1 | 5/2007 | Akkiraju et al. | |
| 2007/0130005 A1* | 6/2007 | Jaschke | 705/14 |
| 2007/0192715 A1 | 8/2007 | Kataria et al. | |
| 2007/0198339 A1* | 8/2007 | Shen et al. | 705/14 |
| 2007/0208619 A1 | 9/2007 | Branam et al. | |
| 2007/0239518 A1 | 10/2007 | Chung et al. | |
| 2008/0004884 A1 | 1/2008 | Flake et al. | |
| 2008/0082412 A1 | 4/2008 | Tallyn et al. | |
| 2008/0104637 A1 | 5/2008 | Rodriguez et al. | |
| 2008/0126515 A1 | 5/2008 | Chambers et al. | |
| 2008/0147478 A1 | 6/2008 | Mall et al. | |
| 2008/0228583 A1 | 9/2008 | MacDonald et al. | |
| 2009/0222329 A1 | 9/2009 | Ramer et al. | |
| 2011/0131109 A1 | 6/2011 | Pappas et al. | |

OTHER PUBLICATIONS

Patent Application entitled, "In-Flight Campaign Optimization," by James D. Barnes, et al., filed Nov. 9, 2006 as U.S. Appl. No. 11/558,021.

Patent Application entitled, "Carrier Data Bassed Product Inventory Management and Marketing," by James D. Barnes, et al., filed Dec. 28, 2006 as U.S. Appl. No. 11/617,703.

Patent Application entitled, "Advertisement Inventory Management," by James D. Barnes, et al., filed Oct. 27, 2008 as U.S. Appl. No. 12/259,187.

Patent Application entitled, "Method and System for Providing Custom Background-Downloads," by Geoff S. Martin, et al., filed Nov. 16, 2007 as U.S. Appl. No. 11/280,576.

Patent Application entitled, "Method and System Using Location History for Targeted Coupon Distribution," by Von K. McConnell, et al., filed May 17, 2000 as U.S. Appl. No. 09/572,282.

Patent application entitled "Method and System for Facilitating Determination of Call-Drop Locations in a Wireless Network," filed Sep. 9, 2003, as U.S. Appl. No. 10/658,353.

Office Action dated Jun. 17, 2008, U.S. Appl. No. 11/405,195, filed Apr. 17 2006, 7 pages.

Office Action dated Aug. 15, 2008, U.S. Appl. No. 11/405,195, filed Apr. 17 2006, 12 pages.

Final Office Action dated Feb. 26, 2009, U.S. Appl. No. 11/405,195, 17 pages.

Advisory Action dated May 7, 2009, U.S. Appl. No. 11/405,195, 2 pages.

Office Action dated Aug. 18, 2009, U.S. Appl. No. 11/405,195, 17 pages.

Office Action dated Feb. 27, 2009, U.S. Appl. No. 11/433,301, filed May 12, 2006, 13 pages.

Notice of Allowance dated Oct. 26, 2009, U.S. Appl. No. 11/433,301, filed May 12, 2006, 7 pages.

Office Action dated Jun. 17, 2008, U.S. Appl. No. 11/403,614, filed Apr. 13, 2006, 7 pages.

Office Action dated Aug. 27, 2008, U.S. Appl. No. 11/403,614, filed Apr. 13, 2006, 11 pages.

Final Office Action dated Mar. 4, 2009, U.S. Appl. No. 11/403,614, filed Apr. 13, 2006, 12 pages.

Advisory Action dated May 7, 2009, U.S. Appl. No. 11/403,614, filed Apr. 13, 2006, 3 pages.

Office Action dated Aug. 20, 2009, U.S. Appl. No. 11/403,614, filed Apr. 13, 2006, 11 pages.

Office Action dated Nov. 3, 2008, U.S. Appl. No. 11/438,540, filed May 22, 2006, 14 pages.

Office Action dated Apr. 28, 2009, U.S. Appl. No. 11/438,540, filed May 22, 2006, 16 pages.

Office Action dated Jul. 10, 2009, U.S. Appl. No. 11/438,540, filed May 22, 2006, 3 pages.

Office Action dated Oct. 16, 2009, U.S. Appl. No. 11/438,540, filed May 22, 2006, 12 pages.

Office Action dated Jan. 6, 2010, U.S. Appl. No. 11/558,021, filed Nov. 9, 2006, 7 pages.

Office Action dated Nov. 14, 2008, U.S. Appl. No. 11/474,880, filed Jun. 26, 2006, 17 pages.

Final Office Action dated May 28, 2009, U.S. Appl. No. 11/474,880, filed Jun. 26, 2006, 23 pages.

Advisory Action dated Oct. 19, 2009, U.S. Appl. No. 11/474,880, filed Jun. 26, 2006, 4 pages.

Advisory Action (corrected) dated Oct. 27, 2009, U.S. Appl. No. 11/474,880, filed Jun. 26, 2006, 4 pages.

Office Action dated Mar. 5, 2010, U.S. Appl. No. 11/474,880, filed Jun. 26, 2006, 24 pages.

Final Office Action dated Apr. 20, 2010, U.S. Appl. No. 11/438,540, filed May 22, 2006, 26 pages.

Final Office Action dated Jun. 29, 2010, U.S. Appl. No. 11/558,021, filed Nov. 9, 2006, 28 pages.
Advisory Action dated Jul. 2, 2010, U.S. Appl. No. 11/438,540, filed May 22, 2006, 4 pages.
Final Office Action dated Aug. 18, 2010, U.S. Appl. No. 11/474,880, filed Jun. 26, 2006, 20 pages.
Office Action dated Aug. 30, 2010, U.S. Appl. No. 11/557,939, filed Nov. 8, 2006, 52 pages.
Advisory Action dated Sep. 22, 2010, U.S. Appl. No. 11/558,021, filed Nov. 9, 2006, 3 pages.
Office Action dated Oct. 14, 2010, U.S. Appl. No. 11/438,540, filed May 22, 2006.
Office Action dated Sep. 30, 2010, U.S. Appl. No. 11/617,703, filed Dec. 28, 2006.
Patent Application entitled, "Communication Device Usage Event Profiling," by Robert E. Urbanek, filed Jun. 8, 2006 as U.S. Appl. No. 11/449,078.
Patent Application entitled, "Dynamic Advertising Content Distribution and Placement Systems and Methods," by James D. Barnes, et al., filed Apr. 17, 2006 as U.S. Appl. No. 11/405,195.
Patent application entitled "Seamless Retrieval of Non-Standard Items for a Mobile Device," filed May 12, 2006, as U.S. Appl. No. 11/433,301.
Patent application entitled "Mobile-Device-Based Coupon Management Systems and Methods," filed Apr. 13, 2006, as U.S. Appl. No. 11/403,614.
Patent Application entitled, "Systems and Methods for State-Based Advertisement Messaging Across Media Types," by James D. Barnes, et al., filed May 22, 2006 as U.S. Appl. No. 11/438,540.
Patent Application entitled, "Inventory Management Integrating Subscriber and Targeting Data," by James D. Barnes, et al., filed Jun. 26, 2006 as U.S. Appl. No. 11/474,880.
Patent Application entitled, "Behavioral Analysis Engine for Profiling Wireless Subscribers," by James D. Barnes, et al., filed Nov. 8, 2006 as U.S. Appl. No. 11/557,939.
Patent Application entitled "Seamless Retrieval of Non-Standard Items for a Mobile Device," by James D. Barnes, et al., filed Jan. 12, 2010, as U.S. Appl. No. 12/686,188.
Notice of Allowance dated Aug. 1, 2012, U.S. Appl. No. 11/617,703 filed on Dec. 28, 2006.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.

* cited by examiner

SUBSCRIBER DATA INSERTION INTO ADVERTISEMENT REQUESTS

CROSS-REFERENCE TO RELATED APPLICATIONS

This application includes subject matter related to the following applications, each of which is hereby incorporated by reference:

U.S. patent application Ser. No. 11/405,195, filed Apr. 17, 2006, entitled "Dynamic Advertising Content Distribution and Placement Systems and Methods," by James Barnes, et al.

U.S. patent application Ser. No. 11/438,540, filed May 22, 2006, entitled "Systems and Methods for State Based Advertisement Messaging Across Media Types," by James Barnes, et al.

BACKGROUND

Advertising and marketing executives are constantly focused on reaching people in new and innovative ways. With the widespread use of wireless communication devices and continuous advances in handset technology, previously untapped avenues of advertising are becoming readily available. Because of the breadth of varying technology in handsets, the many types of media, and the lack of infrastructure to support advertising in the wireless world (compared to, for example, the internet advertising), tools in the form of both software and hardware are needed to efficiently and effectively manage and convey advertising content and campaigns in mobile avenues for advertising.

Various proposed online advertisement serving systems (fixed line or mobile) target advertisements to customers based on customer behavior and demographics. In the proposed systems, publishers must maintain and pass behavioral and demographic data for use by an ad server. There would be, however, no degree of consistency among publishers as to the amount of or types of data maintained, and customers often avoid providing information about themselves to publishers.

SUMMARY

Systems and methods for subscriber data insertion into advertisement requests are provided. Some method embodiments include receiving a request for advertising content for a subscriber. The request contains a unique subscriber identifier associated with the subscriber. The method further includes obtaining carrier controlled subscriber data related to the subscriber based on the unique subscriber identifier. The method additionally includes inserting the carrier controlled subscriber data into the request.

According to some system embodiments, a system for subscriber data insertion into advertisement requests is provided. The system includes a mobile device, an ad server, and a subscriber data insertion unit. The mobile device includes an executable application operable to display an advertisement (i.e., a browser for displaying advertisements within a web page). The ad server delivers the advertisement to the publisher (and ultimately to the mobile device) in response to an ad request from the publisher (due to content being requested from the mobile device). The ad request includes a unique subscriber identifier, wherein the selection of which advertisement delivered is based on carrier controlled subscriber data. The subscriber data insertion unit inserts into the ad request from a publisher the carrier controlled subscriber data based on the unique subscriber identifier.

According to some embodiments, a subscriber data insertion unit is provided. The subscriber data insertion unit includes a receive module, a subscriber data retrieval module, and an insertion module. The receive module receives a request for an advertisement. The request contains a unique subscriber identifier associated with a subscriber for a mobile device. The subscriber data retrieval module obtains carrier controlled subscriber data from a data source controlled by a carrier based on the unique subscriber identifier. The insertion module inserts into the request the carrier controlled subscriber data based on the unique subscriber identifier.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

DETAILED DESCRIPTION

Figure 1A:
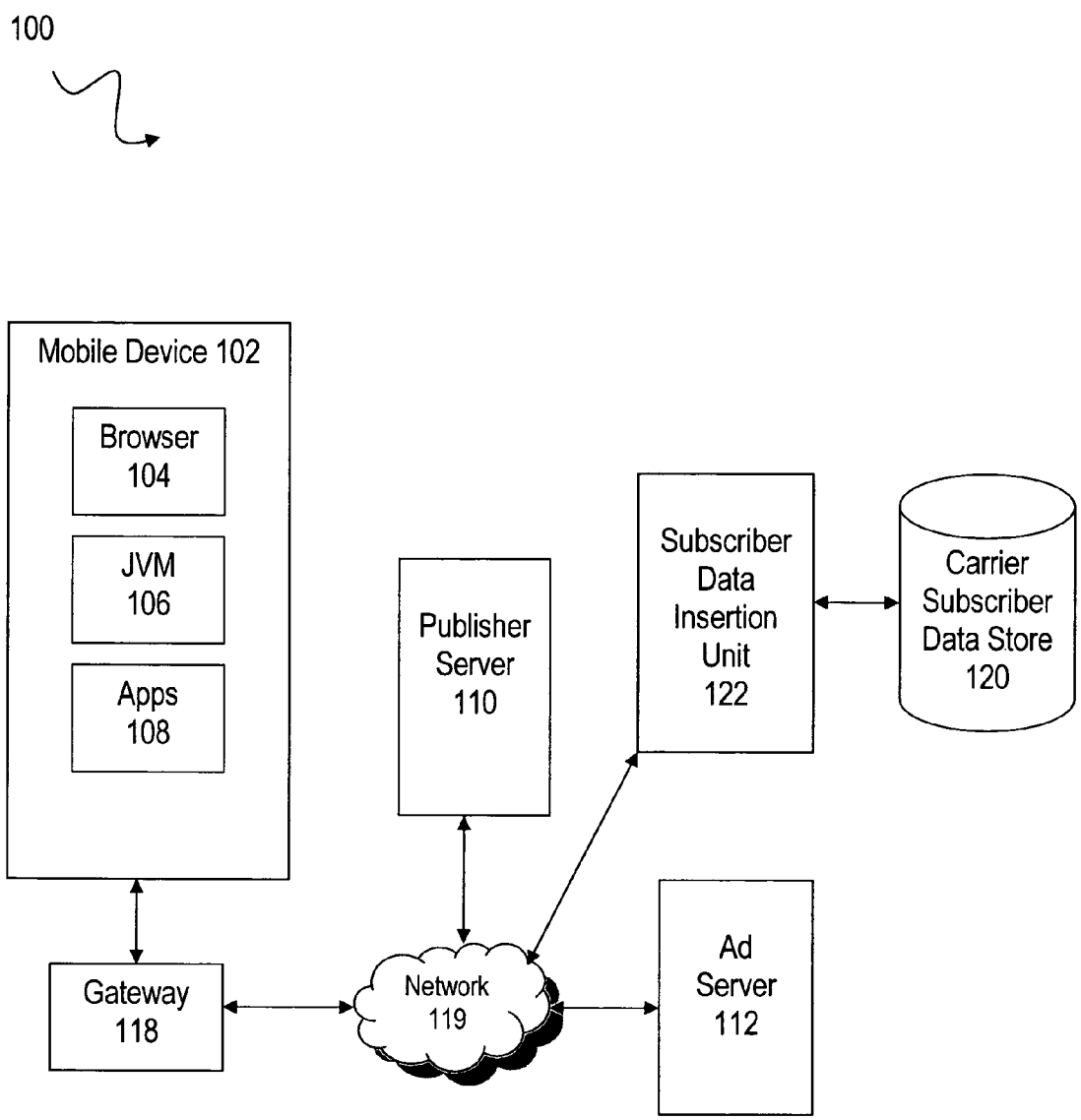
FIG. 1A is a block diagram of a high-level architecture for a system according to various embodiments of the present disclosure.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

I. Overview

With new avenues of advertising available in the mobile device environment, the systems and methods of the present disclosure provide an infrastructure for implementing and managing strategic advertising campaigns while preserving privacy of subscriber data. By developing a system and method to insert subscriber data into advertisement requests between the publisher requesting advertisements and the ad serving system, existing ad servers may be effectively retrofitted for more effective targeted campaigns by leveraging carrier subscriber data inserted between the publisher server and the ad serving system, and maintaining subscriber privacy. Additionally some latency may be avoided. The ad server is enabled by the inserted subscriber data to return targeted, relevant advertisements to the subscriber.

Certain advertising systems proposed for use with the Internet lack the capability to use subscriber data maintained by a carrier, rather than customer data maintained by the publisher, to determine advertisements for display in a mobile device. Carriers are in a unique position to accurately identify each user of mobile devices in its network. Carriers acquire a significant amount of information for each subscriber that may be used to target subscribers with certain advertisements-information that is unavailable to publishers.

The following disclosure is divided into five sections including this overview. Section II defines terminology used in this disclosure. Section III describes in detail a framework for subscriber data insertion in advertisement requests for the methods disclosed in section IV. Section V discusses various proposed solutions, in order to clarify features and advantages of the present disclosure. Section VI describes a general purpose computer on which various systems and methods of the present disclosure may be implemented.

II. Terminology

As used herein, the term "carrier" refers to a telecommunications company that provides communication services for a mobile device under a subscriber agreement.

As used herein, the term "publisher" refers to a company that provides content and has a mechanism to display advertisements within the provided content. For example, a publisher could be a WAP publisher, a multi-media publisher, or a JAVA application publisher. Specifically, publishers are content providers.

As used herein, the term "impressions" refers to the number of instances that any given advertisement has been displayed, or is desired to be displayed by the mobile device.

As used herein, the term "spots" refers to an available instance in an application, splash screen or white space in which an advertisement may be displayed. A spot, in this context of advertising in a mobile device, is analogous to the use of the term "spot" to refer to an available instance for a commercial on television or radio between major programs. Just as "spots" may be sold for advertising on television during a sporting event such as the Superbowl or during a popular program, spots may be sold for advertising in applications, white spaces, and splash screens in a mobile device.

As used herein, the term "targeting information" refers to input criteria that identify an individual or group of individual mobile device users that are to be targeted in an advertising campaign. For example, targeting information such as male, aged 25-35 years old, sports fans could be used for identifying a group of individual mobile device users for a given campaign.

As used herein, the term "media type" refers to the format, technologically, in which a given advertisement is displayed. For example, the media type may indicate whether a given advertisement is displayed via a WAP page or splash screen, through a multi-media player, embedded within a JAVA application or game, or sent in a text message or voice message.

III. General System Architecture

FIG. 1A is a block diagram of a high-level architecture for a system 100 for subscriber data insertion in advertisement requests. The system 100 includes a mobile device 102, a publisher server 110, an ad server 112, a gateway 118, a network 119, a carrier subscriber data store 120, and a subscriber data insertion unit 122, each of which is described in turn below.

A block diagram of an illustrative mobile device 102, as it interacts with the publisher server 110 and the ad server 112, is shown in FIG. 1A. In various embodiments, the mobile device 102 comprises a cellular or wireless telephone, personal digital assistant ("PDA"), handheld computer, or the like operable as a mobile communication device when used in conjunction with telecommunication services provided by a carrier. In some embodiments, the mobile device 102 may comprise, in addition to its basic functionality for communication, a browser 104, a Java Virtual Machine ("JVM") 106, and various J2ME applications 108.

Advertisements are stored in the ad server 112 and conveyed to the mobile device 102 for display in applications such as, for example, the browser 104. For example, the browser 104 of the mobile device 102 retrieves WAP content from the publisher server 110 and advertising content from the ad server 112, and displays the WAP content with the advertising content on a display screen of the mobile device 102.

For each advertisement to be displayed in an application or browser of the mobile device 102, the following may be stored: a name of the advertisement, the content of the advertisement (which in various embodiments comprises a banner style of ad), an expiration date and time.

The gateway 118 is the means through which all HTTP requests from the mobile device 102 enter the network 119. A unique subscriber identifier is associated with each subscriber enrolled by the carrier. The gateway 118 inserts a unique subscriber identifier in each HTTP header request. The unique subscriber identifier is subsequently passed on as part of the original HTTP request to the publisher server 110, and is later passed on to the ad server 112 as a part of an HTTP request for an advertisement. The unique subscriber identifier inserted into the HTTP requests by the gateway 118 (and passed along by the publisher server 110 to the subscriber data insertion unit 122) allows the subscriber data insertion unit 122 to uniquely identify each user of a mobile device 102 to whom an ad will be served, which may then be used by the ad server 112 in targeting advertisements to specific users of mobile devices.

Furthermore, since all network usage by the mobile device 102 passes through the gateway 118 to the network 119, activity of the user of the mobile device 102 may be tracked, including access to the Internet, premium content purchases, advertisements displayed, and the like.

The publisher server 110 is a server or computer system that stores and serves up the publisher's content, such as, for example, a web server that serves WAP content to mobile devices. The publisher server 110 receives a content request that includes the unique subscriber identifier. The publisher server 110 passes the unique subscriber identifier, received from the mobile device 102 via the gateway 118, to the subscriber data insertion unit 122 in order to interface with the carrier subscriber data store 120 for inserting customer demographic and behavioral data in the request to enable the ad server 112 in selection of one or more advertisements (which will be discussed further below). The publisher server 110 delivers the publisher's content, and the content may contain spots into which advertisements are delivered by the ad server 112.

The carrier subscriber data store 120 compiles and stores subscriber data pertaining to each user that subscribes to the carrier, including subscriber identifiers, demographic data, and behavioral data. The data in the carrier subscriber data store 120 may be continuously or periodically updated. The carrier may assign a subscriber identifier to each subscriber when the subscriber enrolls for service through the carrier. Various demographic data is provided by the subscriber upon subscribing with the carrier, and the carrier may obtain additional subscriber information from other sources, such as databases for purchase, wherein the purchased subscriber information may be aligned with subscriber-provided demographic data based on fields such as name, address, or social security number. Examples of demographic data include: age, gender, income level, region of residence, marital status, educational level, and the like.

Behavioral data pertaining to subscribers is obtained based on various events and stored in the carrier subscriber data store 120 in several ways. The carrier receives events from the ad server 112 and the gateway 118 based on user actions or other sources, and records those events into the carrier subscriber data store 120. For each advertisement, the ad server 112 stores the "impression" delivery event (i.e., that the advertisement was actually delivered) to the carrier subscriber data store 120. For user actions, referred to in the industry as "click" events (click-to-URL, click-to-call, click-for-SMS), the gateway 118 records the event to the carrier data store. Other sources of events include applications running on the mobile device 104 (such as, for example, a multimedia player and downloaded Java 2 Micro Edition "J2ME" applications).

The subscriber data insertion unit 122 is coupled to the publisher server 110, the ad server 112, and the carrier subscriber data store 120. The subscriber data insertion unit 122 is physically located such that requests to the ad server 112 pass through the subscriber data insertion unit 122, in the same manner as a proxy server. With the subscriber data insertion unit 122 added to the architecture, his arrangement means that the impact to the publisher is minimized when the publisher requests an advertisement from the ad server. From the perspective of the publisher, it appears that the publisher server 110 directly interfaces with the ad server 112. By virtue of its location between the publisher server 110 and the ad server 112, the subscriber data insertion unit 122 intercepts an ad request with a unique subscriber identifier from the publisher server 110, and using the unique subscriber identifier, retrieves behavioral and/or demographic data about the specific subscriber from the carrier subscriber data store 120 to use in selection of an appropriate advertisement for display in the mobile device to that specific subscriber. Having retrieved subscriber data from the carrier subscriber data store 120, the subscriber data insertion unit 122 then passes the subscriber data to the ad server 112 in an ad request, enabling the ad server 112 to select an appropriate advertisement link or identifier to return to the publisher. The publisher server 110 then responds to a content request from the mobile device 102 with a page having an advertisement link. The advertisement link causes the mobile device 102 to retrieve the advertising content from the ad server 112 and to display the advertising content with the publisher's content in the mobile device 102. In various embodiments, the subscriber data insertion unit 122 is a gateway or router device executing software to carry out the function described herein.

Figure 1B:
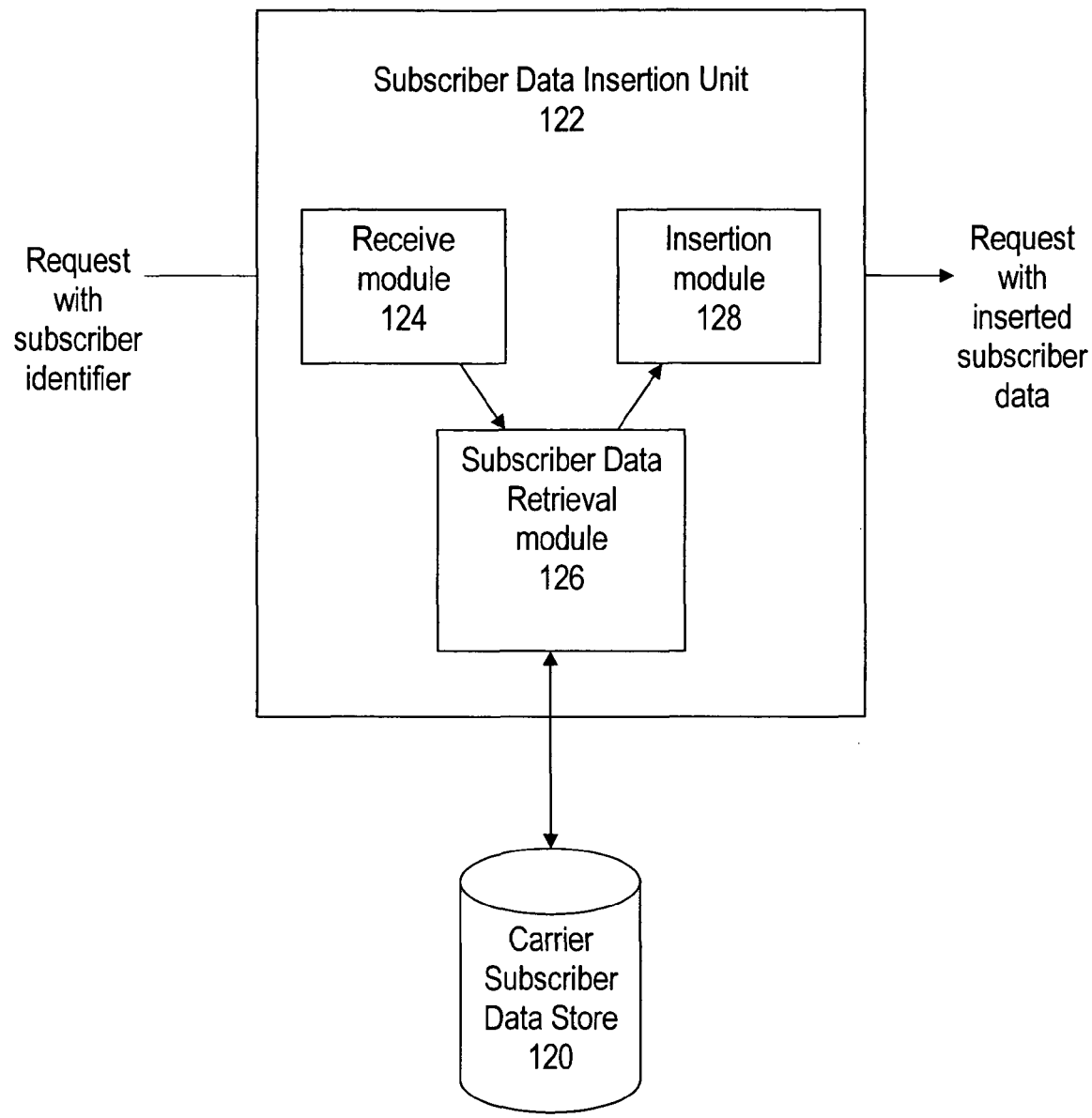
FIG. 1B is a block diagram of the subscriber data insertion unit of FIG. 1A in greater detail according to various embodiments of the present disclosure.

Referring now to FIG. 1B, a more detailed block diagram of the subscriber data insertion unit 122 is shown. The subscriber data insertion unit 122 comprises a receive module 124, a subscriber data retrieval module 126 and an insertion module 128. The publisher server 110 directs requests to the receive module 124 before the ad server 112. The receive module 124 is operably coupled to the subscriber data retrieval module 126. The receive module 124 passes the request to the subscriber data retrieval module 126. The subscriber data retrieval module 126 is coupled to the carrier subscriber data store 120, and obtains from the carrier subscriber data store 120 subscriber data for a given subscriber (whose mobile device generated the request) based on the unique subscriber identifier embedded in the request. The subscriber data retrieval module 126 further passes the request and the retrieved subscriber data to the insertion module 128. The insertion module 128 takes the subscriber data retrieved from the carrier subscriber data store 120 by the subscriber data retrieval module 126, and inserts the subscriber data into the request before re-routing the request to the ad server 112. The unique subscriber identifier need not be passed to the ad server 112, given that the subscriber data is already inserted into the request at this stage.

Referring back to FIG. 1A, the ad server 112 is a server or computer system that stores and serves up advertisement content, such as, for example, a WAP banner advertisement that is inserted and displayed in a WAP page for the mobile device 102. The ad server 112 is coupled to the network 119 and the subscriber data insertion unit 122. The ad server 112 delivers the advertisement content into spots in the publisher's content provided by the publisher. The ad server 112 does not maintain information about the subscribers to whom advertisements are being served. The ad server 112 selects appropriate advertisements for display, for targeting a particular subscriber or group of subscriber, by applying various campaign rules. The determination of which advertisement is "appropriate" depends on the campaign rules and the identity of the subscriber.

The ad server 112 may determine the appropriate advertisement to be served based on complex campaign rules defined by criteria such as, for example but not limited to: subscriber data (based on behavioral or demographic targeting), campaign weighting (i.e., actual impressions delivered vs. planned impressions), advertisement weighting and carrier delivery rules (e.g., frequency capping, advertisement placement restrictions), publisher requirements (i.e., different advertisements for different publishers and different spots), publisher content type (i.e., type of media being published such as WAP, multi-media, and the like), time of day, location of the subscriber (in various embodiments, location is passed to the advertisement management system from the publisher, for example, subscriber zip code, or carrier, for example, GPS defined location), and contextual (e.g., the advertisement is selected as a result of what the user of the device is doing, such as performing a search with keywords. The context of keywords, defined as part of campaign, or a keyword passed to the advertisement management system from the publisher can be used to push related advertisements).

The campaign rules are used by the ad server 112 to select an advertisement based on the subscriber identifier and the subscriber data inserted into an ad request by the subscriber data insertion unit 122. The ad server 112 is operable to deliver advertisements of various media types.

IV. Method for Inserting Subscriber Data into Advertisement Requests

Figure 2:
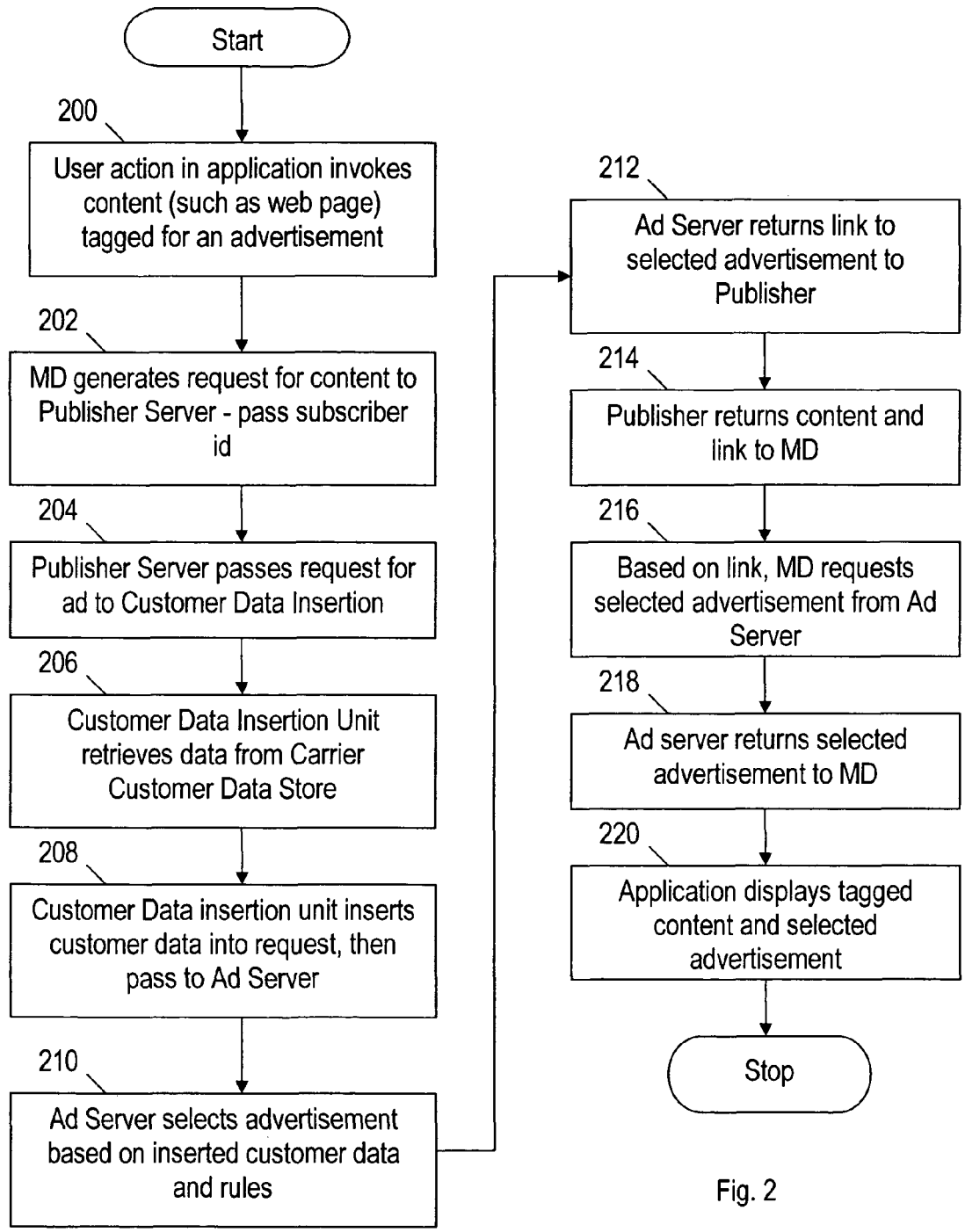
FIG. 2 is a flowchart of a method for subscriber data insertion into advertisement requests according to various embodiments of the present disclosure.

Referring now to FIG. 2, a flowchart is shown of a method for subscriber data insertion into advertisement requests. The method begins with user action in an application that invokes content that is tagged for an advertisement (block 200). For example, the user may click to a WAP site that contains a spot for an advertisement, such as a banner ad. The mobile device 102 generates a request to the publisher server 110 for the content for the application, passing the unique subscriber identifier via the gateway 118 (block 202). In order to determine which advertisement will be served into the spot, the publisher server 110 generates an ad request, including the unique subscriber identifier, to the subscriber data insertion unit 122 (block 204). Note that since the subscriber data insertion unit 122 sits between the publisher server 110 and the ad server 112 as a proxy to the ad server 112, the publisher is not required to do anything above and beyond a standard request for advertising content in order to interface with the subscriber data insertion unit 122.

The subscriber data insertion unit 122 receives the ad request and retrieves subscriber data from the carrier subscriber data store 120 using the unique subscriber identifier (block 206). The retrieved data may include demographic or behavioral information pertaining to the subscriber identified by the unique subscriber identifier. The subscriber data insertion unit 122 inserts the retrieved data into the ad request (by, for example, inserting the retrieved data into the header or body of an HTTP request), and passes the ad request on to the ad server 112 (block 208). The ad server 112 selects the appropriate advertisement based on the campaign rules and the inserted subscriber data passed from the subscriber data insertion unit 122 (block 210).

Having selected an appropriate advertisement to display based on the campaign rules and the inserted subscriber data, the ad server 112 returns a link to the selected advertisement to the publisher server 110 (block 212). The publisher server 110 responds to the original request for content by returning the content (i.e., WAP page content containing the advertising spot) and a link to the selected advertisement to the mobile device 102 (block 214). Based on the link to the selected advertisement, the mobile device 102 requests the selected advertisement from the ad server 112 (block 216). The ad server 112 returns the selected advertisement to the mobile device 102 (block 218). The application displays the content returned by the publisher server 110 and, in the available advertising spot in the content, the application displays the selected advertisement returned by the ad server 112 (block 220).

V. Potential Advantages Over Other Proposed Solutions

Subscriber Data Insertion at the Gateway:

In various other proposed systems which are improved upon by the present disclosure, the gateway is operable to obtain subscriber data from a carrier customer data store based on the unique subscriber identifier. In such proposed systems, the gateway then passes subscriber data along with the unique subscriber identifier in the HTTP request to the publisher, wherein the publisher may pass it to the ad server when requesting an advertisement. The disadvantages to inserting subscriber data through the gateway include the problem that subscriber data would be inserted by the gateway in each and every network request, regardless of whether an advertisement will be served thereby adding unnecessary, undesirable overhead. Alternatively, the gateway in such a system could interface with the ad server to get a list of sites that do contain advertising spots, and insert subscriber data only when such sites are accessed, but architecture to accomplish this would be undesirably complex, requiring synchronization between the ad server and the gateway. Still further, inserting subscriber data through the gateway allows all publishers access to carrier subscriber data, introducing security and privacy concerns that are alleviated by the present disclosure. For these reasons, the gateway 118 of the present disclosure does not interface the carrier subscriber data store 120 nor does it insert subscriber data (other than the unique subscriber identifier) into HTTP requests.

Subscriber Data Insertion at the Publisher Server:

In various proposed systems, analogous to those used for advertising on the Internet, the publisher would directly compile data about customers, such as behavioral and demographic information. In such systems, the publisher would compile such data by utilizing cookies to collect customer behavior data, or by having customers register and provide information about themselves. Such systems are undesirable in that customers may delete cookies, and often customers do not wish to volunteer information upon registration. Additionally, there is no consistency, or standards, across publishers as to the amount of data maintained on customers, making it difficult to plan an advertising campaign across publisher sites. Additionally, security and privacy concerns make sharing carrier subscriber data with publishers an undesirable solution.

The publisher server 110 of the present disclosure, by contrast, does not require that subscribers provide information about themselves, nor does the publisher server 110 require tracking customer behavior data, because in a carrier-controlled network, as in the instant disclosure, the carrier already maintains information about the demographics of its subscribers, and is in a unique position to utilize accurate behavioral information about its subscribers. The privacy and security of subscriber data is maintained by the carrier, since the publisher server 110 does not need direct access to the subscriber data under the present disclosure.

As an alternative approach, for the publisher to leverage carrier data for use in the publisher serves, each and every publisher would be required to interface with carrier controlled data sources, which may be unnecessary and undesirable to some publishers. Such systems are not a highly scalable solution. Each of these disadvantages is alleviated by the present disclosure. For these reasons, the publisher server 110 of the present disclosure does not directly interface the carrier subscriber data store 120 nor does it insert subscriber data into requests passed on to the ad server 112.

VI. General Purpose Computer Implementation

Figure 3:
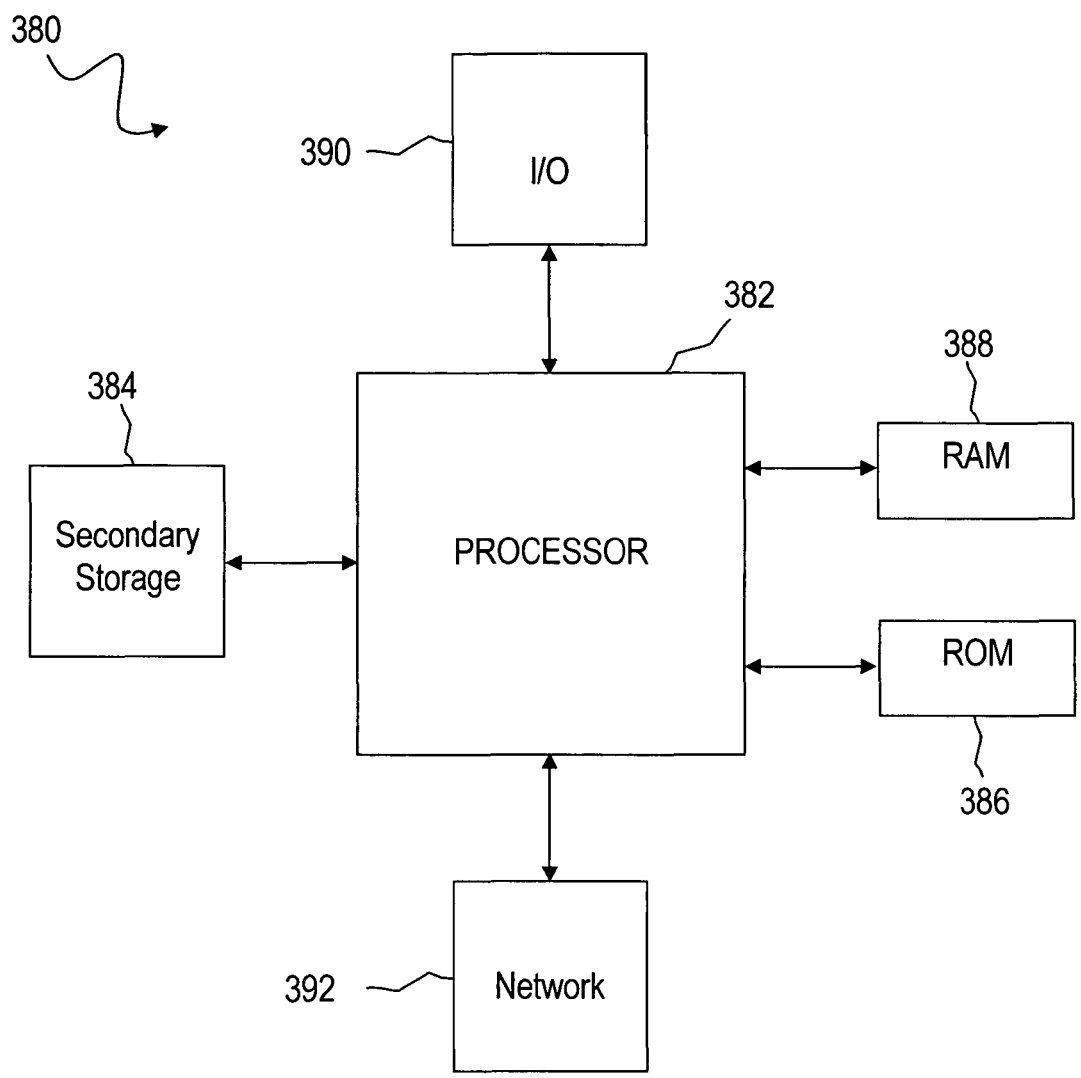
FIG. 3 shows an illustrative general purpose computer system suitable for implementing, at least in part, the several embodiments of the disclosure.

The subscriber data insertion unit of the present disclosure may be implemented, at least partially, on a server or on any general-purpose computer(s) with sufficient processing power, memory resources, and network throughput capability to handle the necessary workload placed upon it, including a server. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, reads only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are reads during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for subscriber data insertion into advertisement requests, comprising:
   receiving a request for advertising content for a subscriber by a subscriber data insertion unit, the request for advertising content received from a publisher server, wherein the request contains a unique subscriber identifier associated with the subscriber;
   based on the unique subscriber identifier, obtaining carrier controlled subscriber data related to the subscriber; and
   inserting the carrier controlled subscriber data into the request by the subscriber data insertion unit.

2. The method of claim 1, further comprising forwarding the request to an ad server once the carrier controlled subscriber data is inserted, thereby enabling the ad server to return a selected advertisement to a mobile device of the subscriber, wherein the selected advertisement is selected based on the carrier controlled subscriber data.

3. The method of claim 2, wherein the request for advertising content is received from a publisher server that delivers publisher content to the mobile device of the subscriber.

4. The method of claim 1, further comprising storing the carrier controlled subscriber data in a data store inaccessible by the publisher server.

5. The method of claim 1, wherein inserting the carrier controlled subscriber data into the request further comprises adding the carrier controlled subscriber data to the unique subscriber identifier in the request, wherein the request is an HTTP request.

6. The method of claim 2, further comprising selecting an advertisement to return in response to the request based on the unique subscriber identifier, the carrier controlled subscriber data inserted into the request, and one or more campaign rules.

7. The method of claim 3, further comprising displaying the publisher content and the selected advertisement in an advertising spot in the publisher content on the mobile device.

8. A system for insertion of subscriber data, comprising:
   a mobile device comprising an executable application operable to display an advertisement;
   a publisher server that delivers publisher content to the mobile device in response to the request from the mobile device;
   an ad server that selects the advertisement in response to an ad request generated by the publisher server, wherein the ad request includes a unique subscriber identifier, wherein the selection of the advertisement is based on carrier controlled subscriber data; and
   a subscriber data insertion unit that inserts the carrier controlled subscriber data obtained based on the unique subscriber identifier into the ad request received from the publisher server.

9. The system of claim 8, wherein the ad server selects advertisements for delivery to the mobile device based on the carrier controlled subscriber data and one or more campaign rules.

10. The system of claim 8, further comprising a data store that stores the carrier controlled subscriber data isolated from access by the publisher server, wherein the subscriber data insertion unit obtains the carrier controlled subscriber data from the data store.

11. The system of claim 8, wherein the ad server stores a plurality of advertisements and delivers the advertisement for display by the mobile device in an advertising spot.

12. The system of claim 8, further comprising a gateway that inserts the unique subscriber identifier into the request.

13. The system of claim 8, wherein the request is an HTTP request.

14. A subscriber data insertion unit, comprising:
   a receive module that receives a request for an advertisement, wherein the request contains a unique subscriber identifier associated with a subscriber;
   a subscriber data retrieval module that, based on the unique subscriber identifier, obtains carrier controlled subscriber data from a data source controlled by a carrier; and an insertion module that inserts into the request the carrier controlled subscriber data based on the unique subscriber identifier.

15. The subscriber data insertion unit of claim 14, wherein the receive module receives the request from a publisher server.

16. The subscriber data insertion unit of claim 15, wherein the insertion module forwards the request to an ad server once the carrier controlled subscriber data is inserted into the request, thereby enabling the ad server to select an advertisement in response to the request based on the carrier controlled subscriber data, thereby further enabling the selected advertisement to be delivered to a mobile device of the subscriber.

17. The subscriber data insertion unit of claim 15, wherein the data source controlled by the carrier and the carrier controlled subscriber data are isolated from access by the publisher server.

18. The subscriber data insertion unit of claim 16, wherein the request is an HTTP request.

19. The method of claim 4, wherein the carrier controlled subscriber data includes at least some subscriber data that is unavailable to publishers.

\* \* \* \* \*